(12) United States Patent
Choiniere et al.

(10) Patent No.: US 9,350,106 B2
(45) Date of Patent: May 24, 2016

(54) STACKING CONNECTOR FOR MILITARY APPLICATIONS

(71) Applicant: BAE Systems Information and Electronic Systems Integration Inc., Nashua, NH (US)

(72) Inventors: Michael J. Choiniere, Merrimack, NH (US); Mark P. Devins, Nashua, NH (US); David A. Richards, Merrimack, NH (US); Kevin D. Galli, Newton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 5 days.

(21) Appl. No.: 14/045,073

(22) Filed: Oct. 3, 2013

(65) Prior Publication Data

US 2014/0099823 A1    Apr. 10, 2014

Related U.S. Application Data

(60) Provisional application No. 61/744,759, filed on Oct. 3, 2012.

(51) Int. Cl.
*H01R 13/60* (2006.01)
*H01R 13/514* (2006.01)
*H04N 5/77* (2006.01)

(52) U.S. Cl.
CPC ............... *H01R 13/514* (2013.01); *H04N 5/77* (2013.01)

(58) Field of Classification Search
CPC .................................................... H01R 23/7073
USPC ........................................................ 439/541.5
See application file for complete search history.

(56) References Cited

U.S. PATENT DOCUMENTS

| 6,913,471 | B2 * | 7/2005 | Smith | 439/74 |
| 2007/0212933 | A1 * | 9/2007 | Kondou et al. | 439/541.5 |

* cited by examiner

*Primary Examiner* — Phuong Dinh
(74) *Attorney, Agent, or Firm* — Daniel J. Long; Kimberly A. Peaslee

(57) ABSTRACT

An electrical connector assembly adapted for military use comprising a high density maintenance connector which supports high bandwidth video export and low level maintenance functions, a lower density I/O connector, the stacking feature allows multiple branches in distribution center, custom to each user, and the programmability allows for identical cables/stacking connectors to be used in different configurations.

1 Claim, 5 Drawing Sheets

- Mates to Type 1, Type 2 and Type 3 Connectors
- Used to add additional low speed UART based peripherals

- Mates to Type 1, 2 and Type 3 Connectors
- Future Upgrade to support alternate DC inputs such as Generator and Vehicle Power

STACKING CONNECTOR FOR MILITARY APPLICATIONS

CROSS-REFERENCE TO RELATED APPLICATIONS

This Application claims rights under 35 USC §119(e) from U.S. Application Ser. No. 61/744,759 filed Oct. 3, 2012, and this application is related to application Ser. No. 61/660,117 filed Jun. 15, 2012 and entitled "MODULAR AVAM WITH OPTICAL AUTOMATIC ATTITUDE MEASUREMENT" and application Ser. No. 61/703,405 filed Sep. 20, 2012 and entitled "RATE AIDED IMAGE REGISTRATION", both of which are assignable to the assignee to this application and are incorporated herein by reference. This application is also assigned to application Ser. No. 14/045,053 entitled "SCENE CORRELATION"; application Ser. No. 14/045,068 entitled "AUTO CORRELATION BETWEEN CAMERA BANDS, both of which are filed on even date herewith and are assignable to the assignee of this application and are incorporated herein by reference.

BACKGROUND OF THE INVENTION

1. Field of the Invention

The present invention relates to military electronics and more particularly to electrical connectors used in military electronics applications.

2. Brief Description of Related Art

In the prior art certain connectors used for military applications have been high-density connectors. Such high-density connectors may not be ideal for large numbers of mate/de-mate cycles as may be required for use under field conditions.

A need, therefore, exists for a connector that provides a high-density capability for certain uses but is also capable of many mate/de-mate cycles for use in the field.

SUMMARY OF THE INVENTION

The connector of the present invention retains a high density type of connector for limited functions, but is also adds a new hot shoe connector. Identified as the maintenance and soldier I/O connectors, respectively, the apportioning of functions to these connectors is based on required data rate, mate cycles, and usage conditions.

Developed from Commercial off-the-shelf (COTS) components, this device enables the user to establish mechanical and communication interfaces between the Line-replaceable units (LRUs) in the single action of mating them.

The maintenance connector supports high bandwidth video export and low level maintenance functions. By mating to a single cable assembly, the connector provides Camera-link video output, a Personal Computer (PC) interface and a Selective Availability Anti-spoofing Module (SAASM) key loader interface.

BRIEF DESCRIPTION OF THE DRAWINGS

The present invention is further described with reference to the accompanying drawings wherein.

DETAILED DESCRIPTION OF THE PREFERRED EMBODIMENT

Figure 1A:
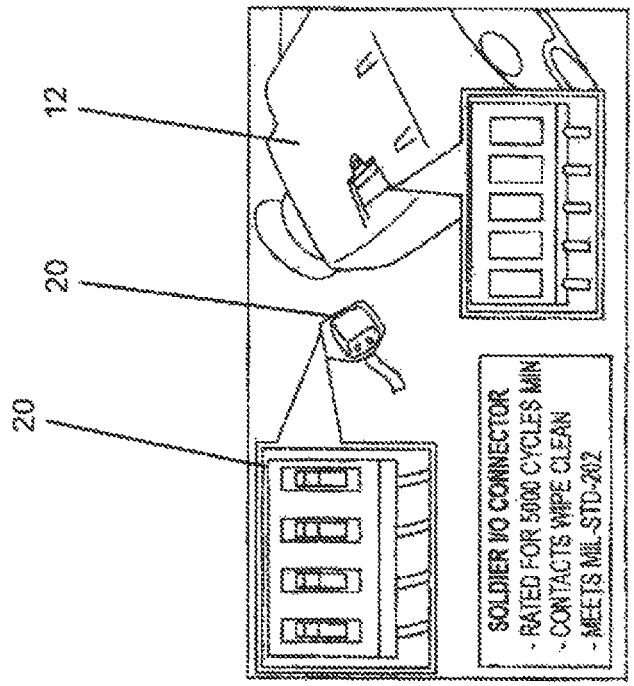
FIGS. 1a and 1b are respectively perspective views of preferred embodiments of the separate maintenance and soldier I/O connectors of the present invention.
Figure 1B:
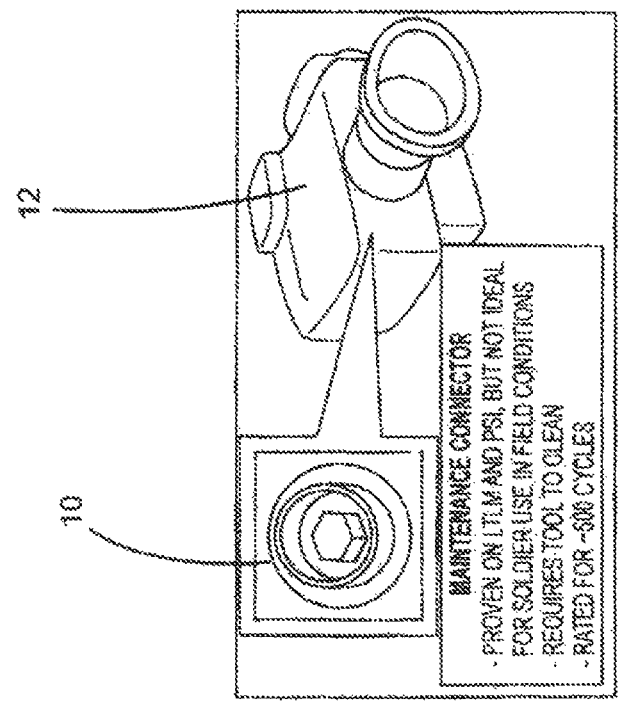

In FIGS. 1a and 1b, there is a maintenance connector 10 on a Laser Target Locator Module (LTLM) 12 which is a high-density connector of about 40-50 pins which may be fragile and tend to break easily in the field. Often what may result is that the user has to connect to the device and usually everything comes out of the connector 10. A large distribution box is then used which then breaks out to all the other different sub-systems such as a battery, remote cable, communication device. Each branch of the service has different requirements with respect to devices that have to be connected which, in the prior art, meant that the distribution box had to become larger to accommodate all different possibilities. Because of this size and resulting cost, we divided the functionality of that connector 10 into two pieces. One piece, i.e., a first connector, would be used in the field and the other piece, i.e, the maintenance connector 10 at a maintenance depot where it may be possible to exercise more care in engaging connectors. FIG. 1B illustrates a 6-10 shoe connector 20 which is hot shoe and this connector is basically a slide-in type of connector, which would use 6 LANS, e.g., flat planes of copper in the connector, as known in the art, and 6 spring contacts and you simply slide a module and it engages those 6 surfaces. The connector 20 is a low-density connector since it uses many less pins than the high-density connector having about 40-50 pins. This connector 20 has is lot of interconnect cycle time, going from 500 cycles in the first, maintenance connector 10 to about 5,000 in the second connector 20 which gives it a greater longevity.

Figure 3:
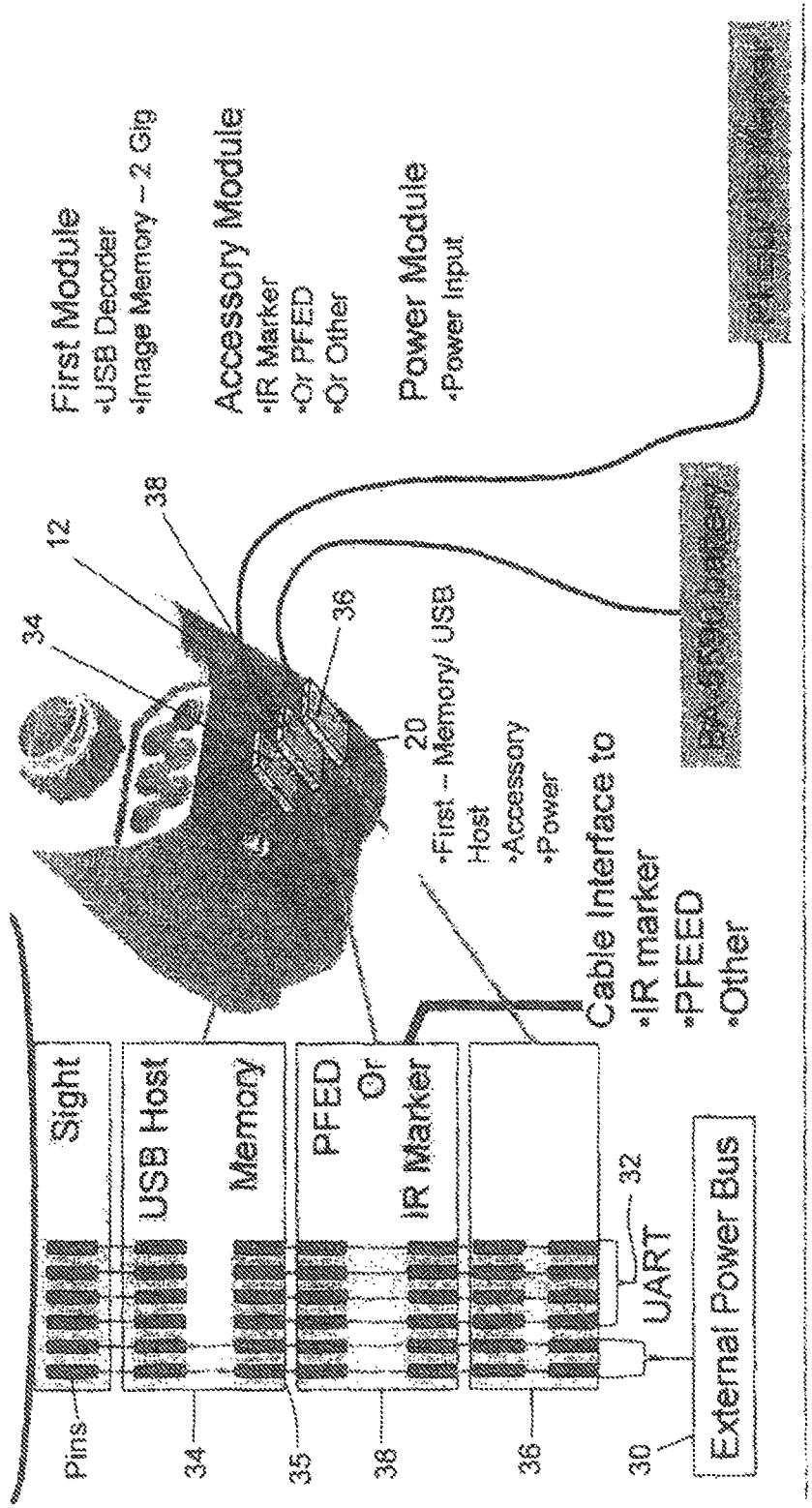
FIG. 3 is a schematic drawing showing a stackable cable assembly, in accordance with a preferred embodiment of the present invention.

FIG. 3 is a schematic drawing showing a stackable cable assembly, in accordance with a preferred embodiment of the present invention, where the 6 pins are broken up into two parts. The first two pins are used for supplying power (external power bus 30), and the last four pins are divided up into communications (COMMs) 32, labeled as a universal asynchronous receiver/transmitter (UART). The COMMs 32 allows us to communicate to other different parts and pieces in the field, including communications, remote connector, or anything else that has a communications device that can communicate through those four pins. Inside the unit on the other side of those four pins is a USB communication line. The first module 34 snaps in the middle of the drawing slides in and snaps into place to the LTLM 12. It has the counterpart to the USB and allows us to do high speed data to memory devices such as a memory stick which can store pictures that the user can take off the unit and bring with him. You can also read from that memory to configure the unit so that if the user is in an Air Force, Marine or Army unit we can now reconfigure the device toward that particular branch of the service using a lookup table of configuration items and so that we can accommodate each branch of the service with respect to the way that the branch wants to operate the device. The device also provides us with the ability to decide which device it would normally communicate. For example, the user could select which communication devices and what protocols would be used. Also it goes one step further, the user can now, within a particular branch of the service, configure the device to the personality of a user. Each user can set their menus up differently, they can program their systems to work a certain way. For example, when the user is on a shift, and another use is relieving him, the user can take his personality module in with him with all his information and then hand the device to the next user. The user slides his module in and his system is immediately configured to his particular usage or need. That includes also mission maps and things that are specific to the mission, e.g. specific to what will be done on the next outing. This feature allows a great deal of versatility. After that the USB hub 34 also allows the user to hook up to it because on the far side 35 of it there is also the same six pins again. They are stackable like poker chips and the first two pins are power and run throughout the entire architecture. Consequently the user can power into the device through an external battery 36 or he can take power out of the device using those two pins to power up anything else so it is a complete power BUS, i.e. it is internal in and external simultaneously. The four pins now transfer basically into a serial COMM so the user may to communicate to things like a remote actuator or an iron marker or a pocket-sized forward entry device (PFED) 38 or any type of communication device to whom the user wishes to communicate with. The user can generate any protocol he needs to talk to those individual devices. An advantage of this arrangement is that these stackable connector 20 ends are all identical so as many can be attached as are to change the connector on the far side of the cable to configure to whatever piece of equipment that may be desired. Each of these may consequently become unique to a particular branch of the service, a particular device, or to a particular architecture, as they simply are stacked on the bottom of this unit.

Figure 2:
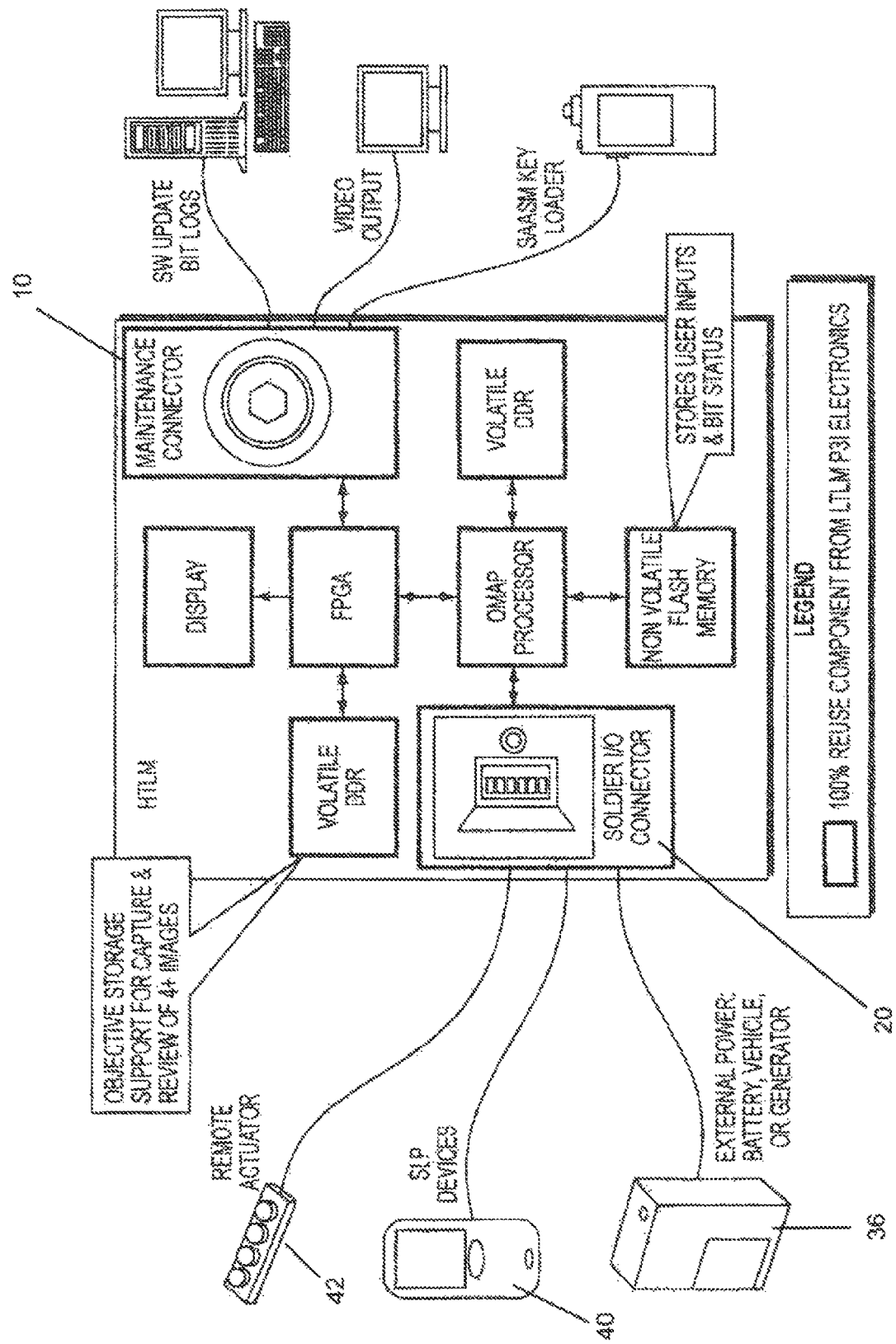
FIG. 2 is a schematic drawings showing the data/image and storage architecture of a preferred embodiment of the present invention.
Figure 4:
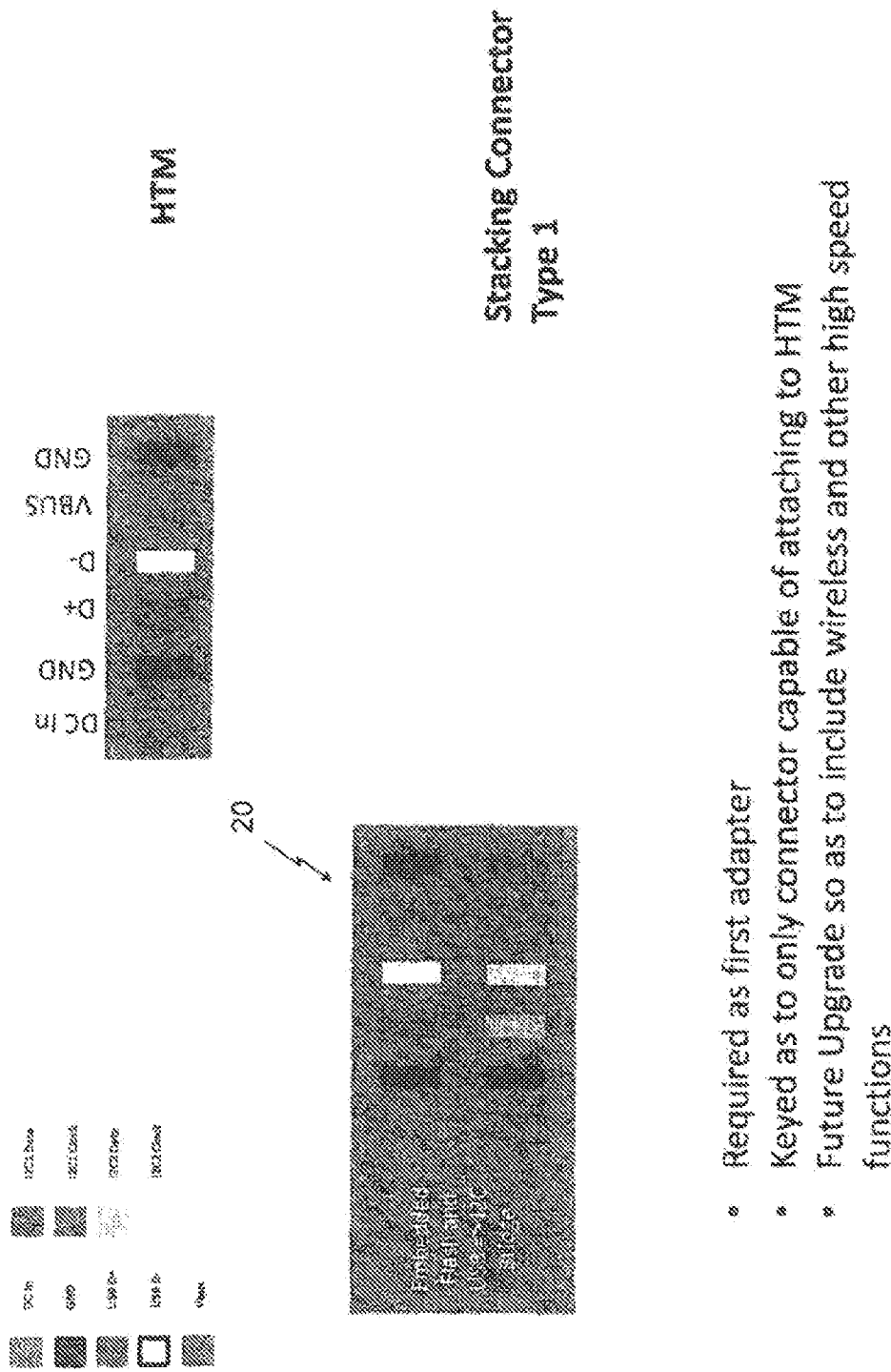
FIG. 4 is a schematic drawing showing a first type of stacking connector, in accordance with a preferred embodiment of the present invention.
Figure 5A:
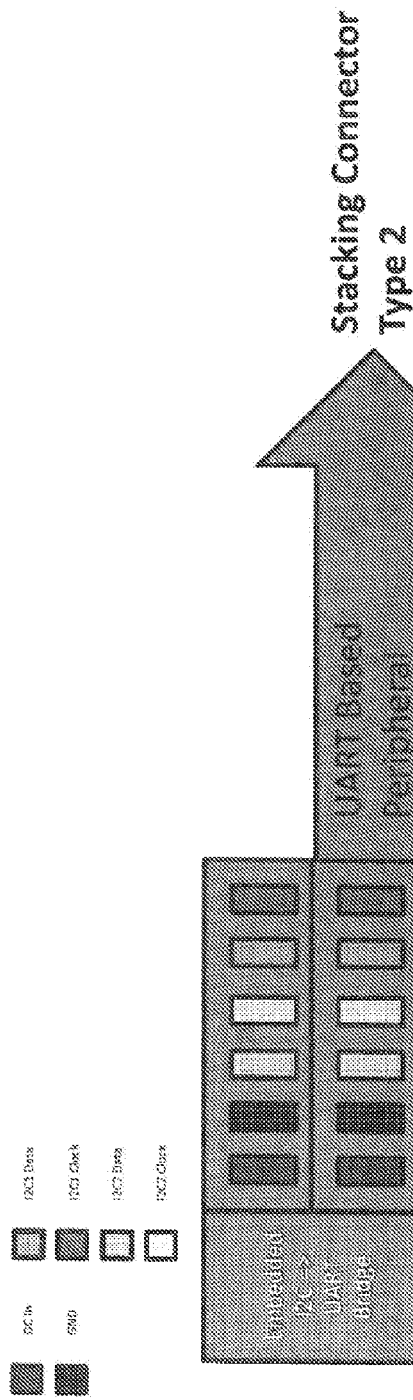
FIG. 5A is a schematic drawing showing a second type of stacking connector, in accordance with a preferred embodiment of the present invention.
Figure 5B:
FIG. 5B is a schematic drawing showing a third type of stacking connector, in accordance with a preferred embodiment of the present invention.

FIG. 2 is a schematic drawings showing the data/image and storage architecture of a preferred embodiment of the present invention. FIGS. 4-5B are schematic drawings showing different types of stacking connector, in accordance with a preferred embodiment of the present invention. Referring to FIGS. 2-5B, the maintenance connector 10 is adapted for use with depot equipment used for calibration. The left side of FIG. 2 shows six pin connector 20 which can hook up to an external battery 36, any service location protocol (SLP) device 40 which is basically a sensor link protocol device, and a remote actuator 42. It can also hook up to an infrared (IR) or any other service equipment that requires serial interface. This feature is the interface to the outside world for the user. It provides a more robust and much cleaner interface in terms of hardware as components are much lighter, smaller and tighter in terms of stacking things together and the cables become a lot easier to replace. Each cable that stacks will have an individual Internet protocol (IP) address. It will be programmed to know that it is an IR marker cable or is a remote actuated cable. That information is fed through the BUS up to the USB so that we can address it at anytime to send it messages as needed.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. An electrical connector assembly adapted for military use comprising:
 a high-density maintenance connector which supports high bandwidth video export and low level maintenance functions;
 a lower density I/O connector; wherein the high-density maintenance connector and the lower density I/O connector are stackable connectors that allow stacking multiple branches in a distribution center, customizable for each user; and the stackable connectors have identical ends and can be arranged to be used in different configurations, and wherein the lower density I/O connector has first two pins for facilitating power functions and last four pins for facilitating communication functions by means of a USB communication line to which at least one module is communicatively coupled with the last four pins for configuring a device having the electrical connector assembly.

* * * * *